United States Patent [19]
Zutz

[11] Patent Number: 5,762,343
[45] Date of Patent: Jun. 9, 1998

[54] SLIDE RING SEAL ASSEMBLY

[75] Inventor: Hans-Henning Zutz, Wermelskirchen, Germany

[73] Assignee: AE Goetze GmbH, Burscheid, Germany

[21] Appl. No.: 593,413

[22] Filed: Jan. 29, 1996

[30] Foreign Application Priority Data

Jan. 27, 1995 [DE] Germany .................. 195 02 467.2

[51] Int. Cl.⁶ ................................. F16J 15/36
[52] U.S. Cl. .................. 277/371; 277/380; 277/385; 277/393
[58] Field of Search .................. 277/35, 38, 39, 277/40, 41, 81 R, 88, 90, 92

[56] References Cited

U.S. PATENT DOCUMENTS

| | | | |
|---|---|---|---|
| 1,780,248 | 11/1930 | Spreen | 277/90 |
| 2,167,669 | 8/1939 | Molyneux | 277/90 |
| 2,240,252 | 4/1941 | Bernstein | 277/39 |
| 3,279,804 | 10/1966 | Blair | 277/92 |
| 3,452,995 | 7/1969 | Engelking | 277/92 |
| 4,189,159 | 2/1980 | Domes et al. | 277/39 |
| 4,421,327 | 12/1983 | Morley et al. | 277/92 |
| 4,429,884 | 2/1984 | Matsumoto | 277/92 |
| 4,688,805 | 8/1987 | Crotti et al. | 277/92 |
| 5,527,046 | 6/1996 | Bedford | 277/92 |

FOREIGN PATENT DOCUMENTS

| | | | |
|---|---|---|---|
| 710143 | 9/1941 | Germany . | |
| 31 11 397 | 10/1982 | Germany . | |
| 4238932 | 5/1994 | Germany | 277/92 |
| 0225629 | 12/1968 | U.S.S.R. | 277/92 |
| 0734794 | 8/1955 | United Kingdom | 277/92 |

Primary Examiner—William A. Cuchlinski, Jr.
Assistant Examiner—John L. Beres
Attorney, Agent, or Firm—Spencer & Frank

[57] ABSTRACT

A slide ring seal assembly includes a slide ring member and a counterring member adjoining the slide ring member in axial alignment therewith. A force-exerting arrangement which axially resiliently presses the two ring members to one another includes a first resilient sealing ring being coaxial with and engaging one of the ring members; and a second resilient sealing ring being coaxial with and engaging the other of the ring members. The first and second sealing rings are in a radial alignment with one another and are stressed by clamping arrangements, so that the sealing rings exert axial forces on the two ring members, pressing them together. At least the first sealing ring and the first clamping arrangement are so designed that the axial restoring force generated by virtue of the deformation of the first sealing ring seeks to reduce the axial dimension of the resiliently deformed first sealing ring. Such an axial restoring force constitutes the axial pressing force exerted by the first sealing ring.

8 Claims, 1 Drawing Sheet

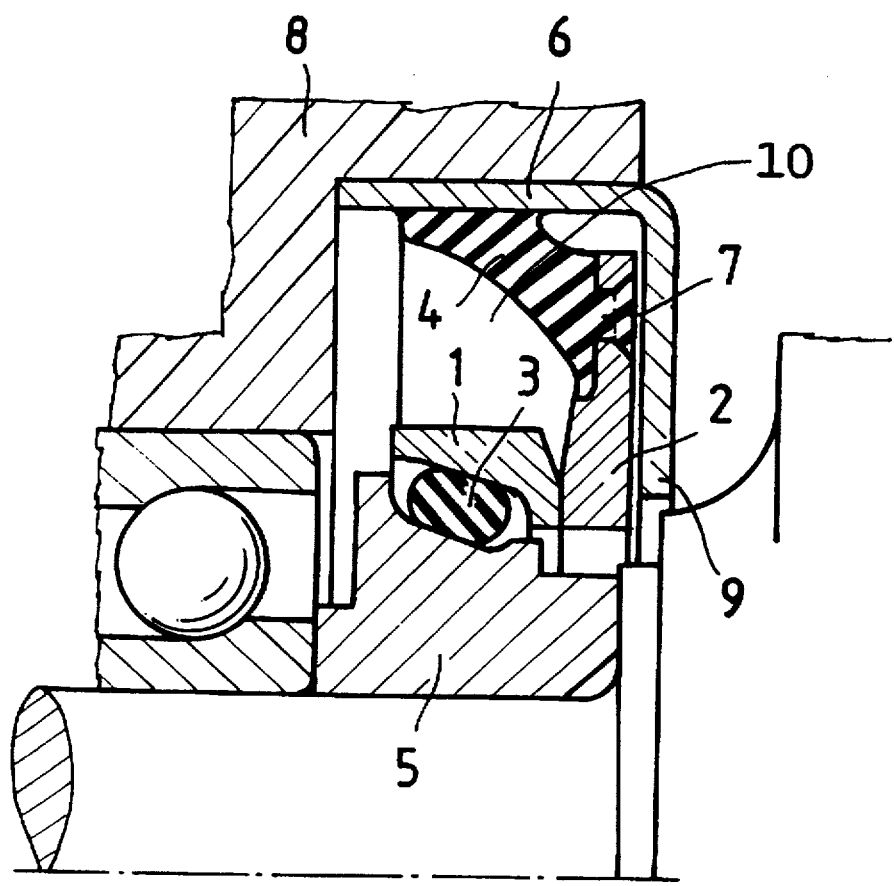

5,762,343

1

SLIDE RING SEAL ASSEMBLY

CROSS REFERENCE TO RELATED APPLICATION

This application claims the priority of German Application No. 195 02 467.2 filed Jan. 27, 1995, which is incorporated herein by reference.

BACKGROUND OF THE INVENTION

This invention relates to a slide ring seal assembly having a slide ring and a counterring which are axially urged to one another by respective elastic sealing rings situated approximately in radial alignment.

Slide ring seal assemblies of the above-outlined type are used particularly in an environment of machine components which rotate relative to one another and which are exposed to very substantial wear. Thus, for example, drive shafts of heavy construction equipment include such slide ring seal assemblies since such machines are exposed to substantial wear by dust, sand, mud or stones.

A slide ring seal assembly of the above-outlined type is disclosed, for example, in U.S. Pat. No. 3,452,995, according to which the slide ring and the counterring are urged to one another by radially essentially aligned elastomer sealing rings (O-rings) clamped between conical surfaces belonging to the slide ring and the counterring, respectively. Even in special machines the trend is a compact structural design with the result that slide ring seal assemblies are allocated less and less space in the machine. The disclosure in the above-noted U.S. patent takes into account this circumstance by arranging the sealing rings in a radial alignment with one another, whereby an axially small structural height results. It is, however, a disadvantage of such an arrangement that the radial height of the slide ring seal assembly is increased, thus increasing the spatial requirements for the assembly in the radial direction.

SUMMARY OF THE INVENTION

It is an object of the invention to provide an improved slide ring seal assembly which has a more compact structural design than prior art devices.

This object and others to become apparent as the specification progresses, are accomplished by the invention, according to which, briefly stated, the slide ring seal assembly includes a slide ring member and a counterring member adjoining the slide ring member in axial alignment therewith. A force-exerting arrangement which axially resiliently presses the two ring members to one another includes a first resilient sealing ring engaging one of the ring members and a second resilient sealing ring engaging the other of the ring members. The first and second sealing rings are in a radial alignment with one another and are stressed by clamping arrangements, so that the sealing rings exert opposite axial forces on the two ring members, pressing them together. At least the first sealing ring and the first clamping arrangement are so designed that the axial restoring force generated by virtue of the deformation of the first sealing ring seeks to reduce the axial dimension of the resiliently deformed first sealing ring. Such an axial restoring force constitutes the axial pressing force exerted by the first sealing ring which thus acts as a tension spring.

By virtue of the invention the conventional conical clamping faces for the sealing rings functioning as compression springs may be omitted. The assembly according to the invention is radially more compact without thereby adversely affecting the sealing function.

2

Preferably, all sealing rings of the slide ring seal assembly have the same resilient force to thus obtain a balancing of the entire sealing assembly as known in conventional designs. This means that despite the highly compact structural design, the slide ring seal assembly according to the invention has a soft spring characteristic. The tension spring is, according to a further feature of the invention, made of an elastomer and is connected with a housing of the slide ring seal assembly.

According to a further advantageous feature of the invention, the tension spring and the slide ring member or the counterring member, as the case may be, are bonded to one another by vulcanization. In the zone of the bond apertures may be provided in the respective ring member into which parts of the associated sealing ring projects to thus obtain a form-fitting connection in addition to the bond.

BRIEF DESCRIPTION OF THE DRAWING

The sole Figure is an axial sectional view of a preferred embodiment of the slide ring seal assembly, illustrated in the installed state.

DESCRIPTION OF THE PREFERRED EMBODIMENT

Turning to the Figure, the slide ring seal assembly shown therein comprises a slide ring 1 and a counterring 2 which are axially urged to one another by elastic sealing rings 3 and 4. In the installed state the slide ring 1 engages a machine component 5 with the intermediary of the compressed sealing ring 3. The circumferential surfaces of the slide ring 1 and those of the machine component 5 are conical so that the sealing ring 3 generates a pressing force in the direction of the counterring 2.

The counterring 2 is connected with an elastomer sealing ring 4 having the effect of a tension spring. By the tension spring effect of the resilient sealing ring 4 there is meant an axial pulling force which may be described as follows:

In the non-installed, relaxed state the sealing ring 4 has a flatter (axially smaller) configuration than in the illustrated, installed state. Since the sealing ring 4 is affixed along its periphery to the inner cylindrical face of an assembly housing 6, in the non-installed, relaxed state the counterring 2 will be brought by the sealing ring 4 axially to the left as viewed in the Figure. During the installation work, that is, as the slide ring seal assembly is inserted in a hub 8 (and on the machine component 5), the slide ring 1 axially pushes the counterring 2 towards the right, thus deforming the sealing ring 4 such that its axial dimension increases. This means that the restoring force generated in the sealing ring 4 due to its deformation is directed to the left and thus seeks to reduce the axial dimension of the resiliently deformed sealing ring 4 towards its relaxed state. It is this restoring force which, as a pulling force of a tension spring, acts axially on the counterring 2, pressing it against the slide ring 1. In contrast, such an axial restoring force seeks to axially expand the other resilient sealing ring 3 which in this respect is of conventional construction. To achieve the above-described axial restoring force for the sealing ring 4, the latter is, as shown in the described exemplary embodiment, of dish-shaped configuration which, in the deformed state is deepened so that the inherent axial restoring force seeks to return the ring shape into its relaxed, shallower configuration. In the described embodiment the sealing ring 4 is an arcuate shell that has a cavity 10 in which the slide ring 1 and the sealing ring 3 are located.

The sealing ring 4 is vulcanized to the counterring 2 and to the inner face of the assembly housing 6. For improving adherence. on the counterring 2 apertures 7 are provided through which the elastomer material of the sealing ring (tension spring) 4 extends. The counterring 2 is connected with the wheel hub 8 via the sealing ring 4 and the housing 6. The resilient force of the tension spring 4 works in the direction of the slide ring 1 and is in magnitude identical to the spring force of the sealing ring 3. To provide protection from external damaging forces, the housing 6 has a radially oriented annular base 9. The tension spring 4 and the sealing ring 3 are in radial alignment with one another so that apart from the short radial structural height there is also obtained a short axial structural height resulting in an overall compact design. It is further feasible to provide also the slide ring 1 with a sealing ring acting as a tension spring or, conversely to the described embodiment, to provide the slide ring 1 with such a tension spring and to provide the counterring 2 with a sealing ring acting as a compression spring.

It will be understood that the above description of the present invention is susceptible to various modifications, changes and adaptations, and the same are intended to be comprehended within the meaning and range of equivalents of the appended claims.

What is claimed is:

1. A slide ring seal assembly comprising
   (a) a slide ring;
   (b) a counterring adjoining said slide ring in axial alignment therewith; said slide ring and said counterring being rotatable relative to one another; one of said slide ring and said counterring being a first ring member and the other of said slide ring and said counterring being a second ring member; and
   (c) force-exerting means for axially resiliently pressing said first and second ring members to one another; said force-exerting means including
      (1) a non-compressed first resilient sealing ring engaging said first ring member in axial tension;
      (2) a second resilient sealing ring engaging said second ring member; said first and second sealing rings being in a radial alignment with one another;
      (3) first clamping means for resiliently deforming said first sealing ring by an axial force axially expanding said first sealing ring giving rise to an axial tension stress therein to generate an axial pressing force urging said first ring member into contact with said second ring member; said axial pressing force exerted by said first sealing ring being identical in direction to an axial restoring force seeking to reduce an axial dimension of said first resilient member from an axially expanded state; and
      (4) second clamping means for resiliently deforming said second sealing ring to generate an axial pressing force therein urging said second ring member into contact with said first ring member.

2. The slide ring seal assembly as defined in claim 1, further comprising a housing accommodating said first sealing ring; said first sealing ring being an elastomer and having a periphery affixed to an inner surface of said housing.

3. The slide ring seal assembly as defined in claim 2, said first sealing ring being affixed to said first ring member.

4. The slide ring seal assembly as defined in claim 3, wherein said first ring member is provided with apertures; parts of said first sealing ring extending into said apertures.

5. The slide ring seal assembly as defined in claim 2, said first sealing ring being bonded to said housing and said first ring member.

6. The slide ring seal assembly as defined in claim 1, wherein said first sealing ring has the shape of a curved, annular shell defining a cavity; said second sealing ring and said second ring member being located in said cavity.

7. The slide ring seal assembly as defined in claim 1, further comprising a housing accommodating said slide ring, said counterring and said first and second sealing rings.

8. The slide ring seal assembly as defined in claim 7, wherein said housing includes a radially oriented annular base.

* * * * *